United States Patent [19]

Stumpf, Jr.

[11] Patent Number: 4,751,833
[45] Date of Patent: Jun. 21, 1988

[54] SPARE TIRE LOCKING DEVICE

[76] Inventor: Charles W. Stumpf, Jr., 3530 Manchester Dr., Bettendorf, Iowa 52722

[21] Appl. No.: 37,715

[22] Filed: Apr. 13, 1987

[51] Int. Cl.⁴ ............................................. E05B 65/12
[52] U.S. Cl. .......................................... 70/259; 70/229
[58] Field of Search ................ 70/259, 260, 229, 230, 70/232

[56] References Cited

U.S. PATENT DOCUMENTS 1,609,440  12/1926  Szydlowski ..................... 70/260
4,294,088  10/1981  Barr ............................... 70/259

FOREIGN PATENT DOCUMENTS 621667  2/1927  France ............................ 70/259
414845  8/1946  Italy ............................... 70/259

Primary Examiner—Robert L. Wolfe
Attorney, Agent, or Firm—Robert O. Richardson

[57] ABSTRACT

A spare tire locking device comprising a lug nut cover and locking base plate for concealing lug nuts which retain a spare tire and wheel on its mounting, thus preventing unauthorized removal of the spare tire and wheel.

2 Claims, 1 Drawing Sheet

U.S. Patent   Jun. 21, 1988   4,751,833
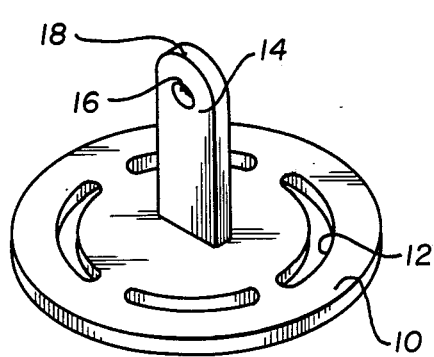
Fig__1__
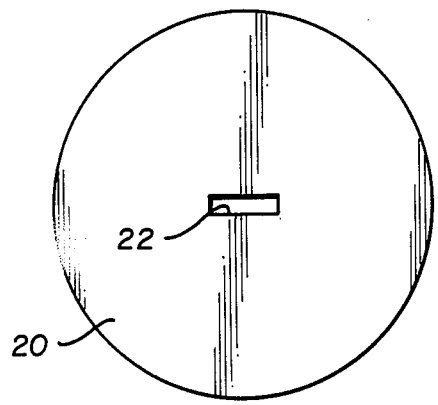
Fig__2__
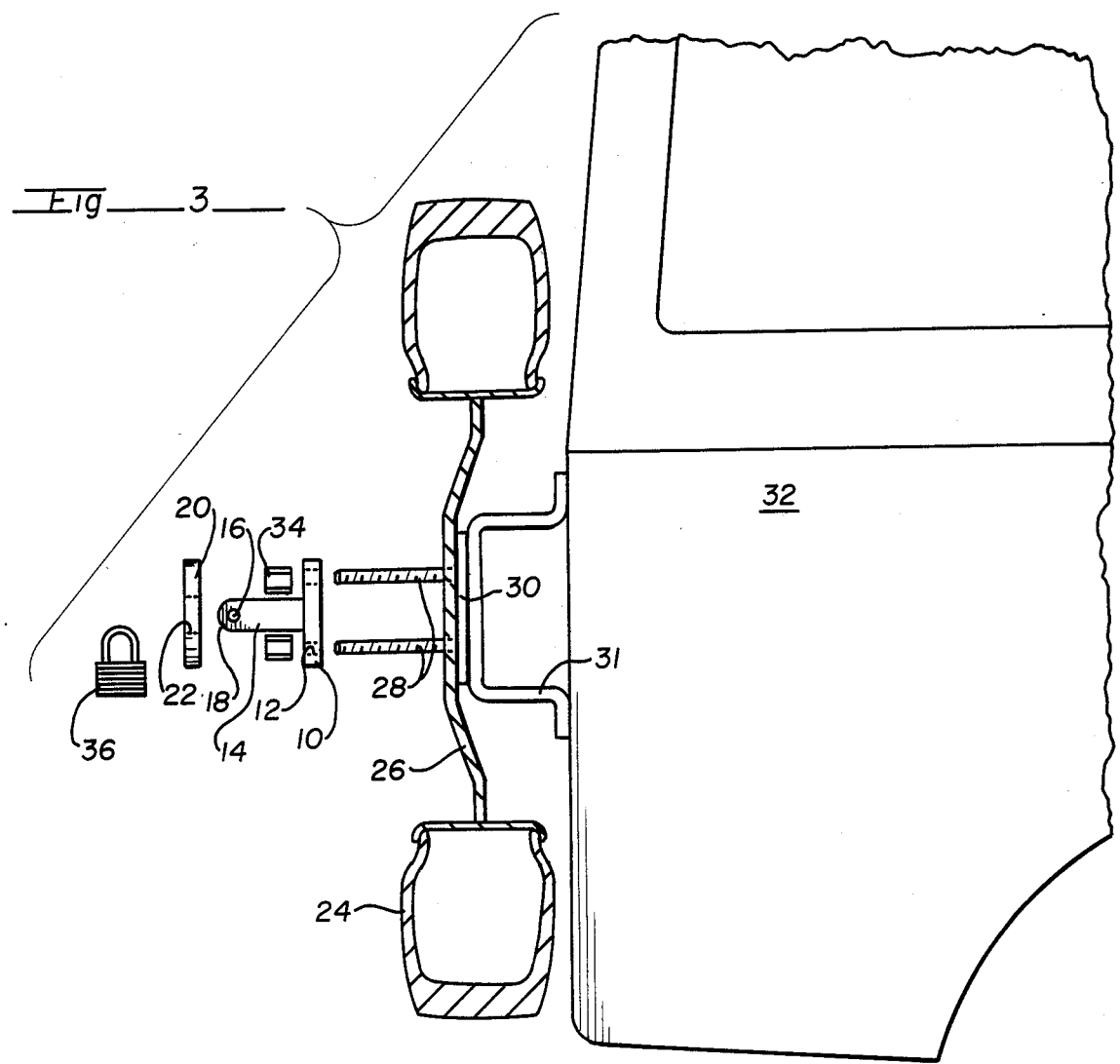
Fig__3__

SPARE TIRE LOCKING DEVICE

BACKGROUND OF THE INVENTION

Spare wheels with tires mounted thereon are attached to the front or rear of Jeeps, trucks, recreational autos and military vehicles. The wheel fits onto studs on a mounting bracket on the vehicle and is retained on the studs with lug nuts outwardly of the wheel on the bracket studs. Removal of the lug nuts frees the spare wheel from its mounting. To prevent unauthorized removal, access to the lug nuts must be prevented.

SUMMARY OF THE PRESENT INVENTION

In accordance with the present invention, a circular locking base plate is provided with apertures to permit its insertion over the studs on the vehicle spare tire mounting bracket. This plate may be inserted over the studs either before or after the spare wheel. This plate has an outwardly extending lock hasp at its center. This hasp has an opening in its outer end to receive the shackle of a padlock. Lug nuts are placed on the studs over the base plate. A circular lug nut cover fits over the studs and on top of the lug nuts. This cover has an opening therein through which the lock has on the baseplate extends. A padlock on the hasp outwardly of the lug nut cover keeps the lug nut cover over the lug nut so that they are unaccessable to tampering and unauthorized removal. All parts are treated so that cutting or mutilation would be extremely difficult.

BRIEF DESCRIPTION OF THE DRAWINGS

FIG. 1 is a perspective view of the locking base plate,
FIG. 2 is a plan view of the lug nut cover, and
FIG. 3 is a sectional view of the spare wheel and tire mounted on a vehicle spare tire mounting bracket with the locking base plate, lug nuts, lug nut cover and padlock in position for installation.

DETAILED DESCRIPTION OF PREFERRED EMBODIMENT

Reference is now made to FIG. 1 wherein is shown the locking base plate 10. This plate is preferably circular in shape and has arcuate openings 12 therein so that it will fit over the studs of various spare tire mounting brackets on various types of vehicles, it being noted that the stud spacing varies with different makes and models of vehicles. Extending upwardly from the center of the base plate is a lock hasp 14 with an opening 16 at its outer end 18 to receive a padlock when assembled. As will be apparent hereinafter, the hasp is of such length that lug nuts and the lug nut cover 20, shown in FIG. 2, will fit between the locking base plate 10 and opening 16.

As shown in FIG. 2 the lug nut cover 20 is preferably of circular shape with an opening 22 in its center. This opening is of such size and configuration as to permit passage therethrough of lock hasp 14 of the locking base plate 10, shown in FIG. 1. For convenience and economy in manufacturing the lug nut cover 20 may be identical to the locking base plate 10 before lock hasp 14 is affixed to it. Arcuate slots on the lug nut may serve no useful purpose but neither do they destroy the utility and purpose of lug nut cover 20 since the width of the slots are less than the width of the lug nuts. Even with arcuate slots the lug nut cover 20 protects the lug nuts from tampering.

FIG. 3 shows spare tire 24 and wheel 26 positioned on studs 28 on baseplate 30 which is affixed to vehicle 32 by a mounting bracket 31. The locking base plate 10 in FIG. 1 is positioned so that the ends of studs 28 pass through arcuate openings 12 as plate 10 is seated against the center of wheel 26. Lug nuts 34 are then tightened on the studs over the base plate. After this is done the lug nut cover 20 in FIG. 2 is placed over the lock hasp 14 on the locking base plate 10 and the shackle of padlock 36 is inserted through the opening 16 in lock hasp 14.

In an alternate arrangement the locking base plate 10 may be positioned on the studs 28 first and the wheel 26 is then placed onto the studs 28 and over the base plate 10. In this arrangement the length of hasp 14 is longer by the thickness of the metal of wheel 26.

While details of the preferred embodiment has been described, it is understood that modifications and improvements are believed to be within the ability of one skilled in the art, and it is to be understood that such deviations from the described preferred embodiment are considered to be within the preview of the present invention as set forth in the following claims.

What I claim is:

1. A spare wheel and tire locking device for preventing unauthorized removal of a spare tire from its mounting bracket on an automotive vehicle, said mounting bracket having outwardly extending studs on which said wheel is placed.

a locking base plate having arcuate shaped apertures therein adapted to receive said studs therethrough, said locking base plate having an outwardly extending lock hasp with an opening at its outer end, lug nuts insertable onto said studs over said wheel and said locking base plate, a circular lug nut cover having an opening therein receiving said hasp therethrough, the opening in said hasp extending outwardly from said lug nut cover, and a padlock having a shackle insertable into said hasp opening to maintain said lug nut cover over and on top of said lug nuts to prevent unauthorized removal of said lug nuts from said studs.

2. The combination as set forth in claim 1 wherein said locking base plate is first inserted onto said studs and said wheel is then placed thereover on said studs, and wherein said hasp is of sufficient length that its opening is still outwardly of said lug nut cover.

* * * * *